2,842,338

COMPOSITION AND METHOD FOR PLUGGING AND CONSOLIDATING

Robert W. Davis, Hermosa Beach, Calif., and James L. Lummus, Tulsa, Okla., assignors to Pan American Petroleum Corporation, a corporation of Delaware No Drawing. Application May 17, 1956
Serial No. 585,399

10 Claims. (Cl. 255—1.8)

This invention relates to plugging normally permeable solid bodies such as formations penetrated by wells. In addition, it relates to consolidating relatively loose bodies of particles such as unconsolidated soils, filter cakes in wells, and the like. Still more particularly, the invention relates to a drilling fluid for laying down a filter cake which can be set in the well to form a consolidated impermeable sheath for the well.

Calcium acrylate has been used to impermeabilize and consolidate soil. In the usual method, the monomeric calcium acrylate is mixed with the soil and is then caused to polymerize to form a polymer in which the acrylic acid groups are connected to each other and are also cross-linked by the divalent calcium ions. If properly polymerized, the resulting cross-linked polymer binds the soil mass into a relatively impermeable consolidated body. The polymerization is affected by many factors, however, making the process difficult to control. In addition, the reaction is limited almost exclusively to calcium acrylate since the monomeric acrylates of other polyvalent metals are, in general, too insoluble to be used. If the method is to be used in wells, the polymerization is even more difficult to control. Also, the polymerization reaction is rather slow, requiring several hours to form a reasonably solid polymer. It is generally difficult to maintain static conditions in a well over such an extended time.

An object of this invention is to provide a drilling fluid which will form a filter cake which can be consolidated, the filtrate from the drilling fluid being settable by appropriate means to consolidate or plug the formations behind the filter cake. Another object of the invention is to provide a method for increasing the degree of consolidation and decreasing the permeability of a porous mass of material such as soil, formations penetrated by a well, or the like, by forming an acrylate polymer in said mass. A more specific object is to provide an easily controlled method for forming an acrylate polymer cross-linked by a polyvalent cation in such porous masses. A still more specific object is to provide a method for consolidating soils. Another more specific object is to provide a method for consolidating or plugging a formation penetrated by a well. An additional specific object is to provide a method for forming a filter cake on the wall of a well, this filter cake being settable by suitable means to form an unconsolidated impermeable sheath for the well.

In general, the objects of our invention are accomplished by employing acrylic acid which has been polymerized, and cross-linking this polymer under field conditions with a suitable polyvalent cation. In this way the relatively sensitive catalytic polymerization of the acrylic acid can be carried out at a location such as a chemicals manufacturing plant where the reaction can be closely controlled. The cross-linkage by a polyvalent cation is then carried out under field conditions. This reaction is relatively much less sensitive than the polymerization reaction. Therefore, the final results are not so seriously affected by variable conditions of field applications as when the polymerization reaction is attempted in the field.

Broadly, our method comprises forming a cross-linked polymer of acrylic acid and a polyvalent cation in a porous mass by contacting the mass with an aqueous solution of a polyacrylic acid and an aqueous solution containing a polyvalent cation, the polyacrylic acid and cation being introduced in sequence.

The best measure of the degree of polymerization of the acrylic acid is the viscosity of the polymer. Since most polyacrylic acids are solids, the viscosity of a 10 percent by weight aqueous solution should be measured. If the viscosity of such a solution is less than about 5 centipoises, the polymer will not form a sufficiently hard material for our purposes when it is cross linked by a polyvalent cation. If the viscosity of the solution is greater than about 200 centipoises, hardening occurs very rapidly upon contact with the polyvalent cation. Thus, if a highly viscous polyacrylic acid is injected into a mass of material containing a high concentration of a polyvalent cation, the reaction will be so rapid that little penetration of the polyacrylic acid into the mass can occur. Only the surface of the mass may be consolidated. The same is true if the polyacrylic acid is injected first and the polyvalent cation is introduced second. The viscosity should be measured at a temperature of about 70° F. by a Stormer viscosimeter rotating at about 600 R. P. M.

Polyacrylic acid is generally obtainable as an aqueous solution containing from about 10 to 25 percent by weight of the acid polymer. Such solutions may be used full strength or may be diluted to a concentration as small as 5 percent by weight. Concentrations up to 50 percent by weight may be used if desired, in some cases. In general, higher concentrations of the lower viscosity material should be used to insure good consolidation while lower concentrations of the high viscosity polymers are usually employed to avoid excessively rapid hardening of the material in the cross linking reaction.

Polymers of unsubstituted acrylic acid are preferred but polymers of the substituted acid such as, for example, methacrylic acid may also be employed if in the proper viscosity range indicated above. Some polyacrylic acid salts of monovalent cations such as sodium, potassium, ammonium, or the like, may be present. However, the monovalent cation salts cross link with difficulty since an exchange of the polyvalent cation for the monovalent cation must first take place. Thus, while the monovalent cation salts of polyacrylic acid do no harm and may be present, they are relatively ineffective as sources of polyacrylic acid for our purposes. Such polyacrylic acid salts should be disregarded in calculating the concentration of polyacrylic acid. Monovalent cations in the mass to be consolidated may react with the polyacrylic acid and render it relatively ineffective for cross linkage by the polyvalent cations. This is particularly true if the polyacrylic solution is introduced first. For this reason, among others, solutions containing the polyvalent cations should be introduced first into the mass to offer the greatest possible chance for reaction of the polyacrylic acid with the polyvalent cations. Preferably, the solution containing polyvalent cations should be used as a flush to remove as many of the monovalent cations as possible.

The polyvalent cation in aqueous solution may be nonmetallic in nature but preferably should be a metallic cation. Examples of suitable non-metallic cations are the ions of the water-soluble polyamines such as diethylenetriamine, triethylenequatramine, and the like. Preferably, water-soluble salts such as the hydrochlorides or nitrates of such amines should be used. It is possible, however, to use aqueous solutions of the amines themselves as sources of the polyvalent cations since sufficient formation of the corresponding ammonium ions takes place in water, particularly if the pH is below about 7.

The polyvalent metallic cations may be those of divalent metals. For example, the alkaline earth metals such as calcium, magnesium, barium, strontium, and the like, may be used. The cations may also be ions of trivalent metals such as aluminum or chromium. Water-soluble salts of these cations are, of course, used as sources of the cations. For example, calcium chloride, calcium nitrate, or calcium ferrocyanide, are suitable water-soluble salts of calcium. Magnesium chloride or magnesium sulfate are examples of suitable salts of magnesium. Aluminum nitrate and aluminum sulfate are examples of satisfactory salts of a trivalent metal. Certain of the chromic sulfates, chlorides and nitrates represent other examples of satisfactory materials. In general, the requirements for the salt are that it be water-soluble and that it ionizes to produce a polyvalent cation in solution.

By the term "water-soluble salt" we intend to indicate one which is soluble to the extent of W/2MV pounds per 42-gallon barrel of water. In this formula W is the molecular weight of the salt, M is the number of polyvalent cations in the salt, and V is the valence of the cations. Thus, if calcium chloride is used, the solubility should be 111/2 x 1 x 2 or about 30 pounds per barrel, since 111 is the molecular weight of calcium chloride, there is only one calcium ion per molecule, and the valence of calcium in the salt is 2. It has been found that the minimum concentration of calcium chloride in aqueous solution to give a satisfactory cross-linkage of polyacrylic acid is about 30 pounds per barrel. If the molecular weight of the salt is lower than calcium chloride, if it contains more polyvalent cations per molecule than calcium chloride, or if the cation has a higher valence than calcium, less of the salt is required, of course, to give the same cross-linkage of the polyacrylic acid. The formula takes care of these variations. The concentration of salt normally should not exceed 5 or 6 times the quantity W/2MV to avoid excessively fast rates of cross-linkage of the polyacrylic acid with consequent poor penetration of the mass being treated.

Theoretically, the ratio of the quantity of the source of polyvalent cation to the quantity of polyacrylic acid should be such as to provide sufficient polyvalent cations to react with all the acidic groups of the polyacrylic acid. As a practical matter, however, this ratio is not particularly important. A great excess of either the cation or the acid may be present without harming the cross-linkage reaction. So long as the concentrations are within the limits specified above, the cross-linkage will occur to a sufficient degree to cause a satisfactory increased consolidation and decreased permeability of the treated mass for our purposes. The actual quantities used depend upon the nature of the treatment. For example, if a soil is to be consolidated and the soil is picked up and slurried with one solution, after which the other solution is applied, the quantity of the first solution should be between about 10 and 40 percent of the volume of the compacted soil. This provides an easily workable slurry and supplies sufficient of the solution to react with the second solution when it is added to form a well consolidated mass.

As another example, if the process is used in treating formations penetrated by a well, at least sufficient of the first solution should be used to fill the pore volume of the formation to the depth to which consolidation and impermeabilization is desired. Normally this will be about 1 to 10 or 12 inches deep. A flush of several pore volumes of the solution containing polyvalent cations may be employed as the first step, however, to displace monovalent cations from the formation and prevent reaction of these monovalent cations with the polyacrylic acid which is injected later.

In both the soil and the formation penetrated by a well, the quantity of the second solution, usually polyacrylic acid, will be governed principally by the rate of the cross-linkage reaction. As soon as this reaction has proceeded to any appreciable degree, the treated mass becomes too impermeable to permit further injection of the second solution. In the case of soils, the second solution, if sprinkled on the surface, may penetrate to a depth of as much as 2 or 3 inches. It may be raked in to an even greater depth however, if desired. In the case of formations penetrated by wells, it is possible to apply pressure to the second solution so it may be injected to a depth of 10 or 12 inches before the cross-linkage reaction proceeds sufficiently to prevent further flow. The volume of the second solution can be adjusted accordingly.

If our invention is applied to wells, the cross-linked acrylic polymer is caused to form in the filter cake on the well wall or in the formations penetrated by the well by contacting the filter cake and formation first with a polyvalent cation and then with polyacrylic acid or viceversa. Preferably, the filter cake and formation are contacted by the polyvalent cation by using a calcium base drilling fluid containing a high calcium ion concentration. The filter cake laid down by such a drilling fluid will contain a high concentration of calcium ions. The filtrate from the drilling fluid which penetrates into the formation will also contain a high calcium ion concentration. It will be noted that one advantage of using such a drilling fluid is that the formation is penetrated only by a high-calcium brine. Thus there is no danger of blocking formations sensitive to fresh water or brines containing sodium ions. At any time, polyacrylic acid can then be injected into the filter cake and formation to consolidate and impermeabilize them. Until the polyacrylic acid is injected, the filter cake and formation are in the same form as when any other drilling fluid is employed. There is no danger of premature setting. For example, if a zone of sloughing shale is being drilled where the sloughing is caused by penetration of filtrate into sand stringers in the shale, ordinary drilling operations with our high calcium mud can continue until such time as difficulty with the sloughing shale begins. Polyacrylic acid can then be squeezed into the shale zone to impermeabilize the sand stringers so no further penetration of the stringers by drilling fluid filtrate can occur. The treatment is thus employed only where needed and not above or below this point.

The high calcium drilling fluid should contain at least about 30 pounds of a water-soluble calcium salt such as calcium chloride, per barrel of drilling fluid. The usual breakover chemicals such as quebracho, calcium lignosulfonate and the like, usually are not suitable for preparing drilling fluids containing so much soluble calcium salts. We have found that an alkali metal salt of a condensed naphthalene sulfonic acid is suitable as a breakover chemical for preparing such drilling fluids. The general formula for such materials is $$C_{10}H_6SO_3A(CH_2C_{10}H_5SO_3A)_nC_{10}H_6SO_3A$$

For our purposes, $n$ should be between 1 and about 5. The letter A represents an alkali metal, preferably sodium.

The composition of the drilling fluid should be as follows:

| Ingredient: | Concentration, lb./bbl. |
|---|---|
| Clay solids | 5 to 150 |
| Condensed naphthalene sulfonate | 3 to 10 |
| Soluble calcium salt | At least W/4M[1] |

[1] W is the molecular weight of the calcium salt and M is the number of calcium ions per molecule of the salt.

These ingredients, together with the water base and perhaps a little crude petroleum oil or fraction thereof, are the essential constituents of our drilling fluid. Other usual ingredients of drilling fluids such as sand, shale particles and the like, as well as additives such as phosphates, lost circulation recovery materials, and weighting agents may also be present. The pH of the drilling fluid should be maintained as low as possible to avoid precipitation of the calcium, as calcium hydroxide. One of the advantages of the condensed naphthalene sulfonate is that it does not require caustic to be effective as a dispersant in breaking over the drilling fluid to calcium base.

The clay solids may be of any type, such as montmorillonite, illite, kaolin, or attapulgite. The condensed naphthalene sulfonate should preferably contain about 6 naphthalene sulfonate groups per molecule. That is, $n$ in the formula given above should preferably be about 4. It may contain from about 3 to 8 such groups. The sulfonate is preferably the sodium salt but may be the salt of any other alkali metal such as potassium or lithium. We prefer to employ calcium chloride as the water-soluble calcium salt in our drilling fluid because of the low cost of the chloride and also because of greater experience with this material. Other water-soluble salts such as calcium nitrate, calcium acetate, or the like, may also be used, however. Weighting agents, lost circulation recovery additives, viscosity reducers, and other special purpose additives may be introduced as needed. In particular, an antifoaming agent such as tributyl phosphate may be used in a concentration up to about 0.1 pound per barrel to combat the foaming tendency of the condensed naphthalene sulfonate.

For example, a drilling fluid of the type contemplated by our invention, was prepared using water and the following additives:

| Additive: | Concentration, lb./bbl. |
|---|---|
| Natural clay | 20 |
| Bentonite | 10 |
| Lomar D | 5 |
| Calcium chloride | 70 |

Lomar D is a condensed sodium naphthalene sulfonate containing about 6 naphthalene sulfonate groups per molecule.

The properties of this mud, as measured by the standard tests specified in API Code No. 29, Second Edition, July, 1942, (tentative), were as follows:

| | |
|---|---|
| Fluid Loss | 11 cc./30 min. |
| Gel strength: | |
| Zero | 0 grams |
| 10 Min. | 10 grams |
| Viscosity | 30 centipoises |

This drilling fluid was used in a test of our method in a 55-gallon drum. In this test the drum was set on one end and 4 valves were connected through the wall of the drum to its interior at a level of about 1/3 of the height of the drum. The valves were equally spaced around the drum. In addition, 4 more valves were attached at a level of about 2/3 of the height of the drum and directly above the lower valves. Thus, the drum had 8 openings, controlled by valves, in the wall. All valves were closed and the drum was filled with water. A screen cylinder, 2½ inches in internal diameter was placed vertically in the center of the drum. This cylinder was composed of two layers of ¼-inch mesh screen and 3 layers of screen having about 18 wires to the inch. A section of 2-inch pipe was placed in the center of the screen cylinder to prevent its collapse. Sand was then poured into the drum around the screen cylinder until the drum was full. This sand was commercial sand used for building construction work and contained particles falling principally in the range passing a 6 mesh screen and being retained on a 100 mesh screen. The pipe was withdrawn from the center of the cylinder to form a simulated well in the drum. A lid was then clamped on the drum. This lid had a section of 2½ inch pipe through the center extending about 6 inches down into the sand in the barrel, thus simulating a surface casing. Passing down through the center of the 2½ inch pipe was a section of ¾-inch pipe which extended to within about 3-inches of the bottom of the drum. The drilling fluid described above was circulated down through the ¾-inch pipe and up through the screen-lined hole to deposit a filter cake on the wall of the simulated well. During this circulation time a back pressure of about 5 p. s. i. was imposed on the outlet 2½ inch pipe from the top of the well. The upper and lower sets of valves on the openings through the drum wall were opened alternately for short times about every 15 minutes to permit the necessary flow of filtrate into the sand to establish a filter cake. The mud was pumped through the simulated well for 2 hours one day and for 3 hours the next, circulation being stopped for 16 hours overnight.

Circulation of drilling fluid was stopped after 5 hours and the drilling fluid was displaced from the well by water. This water was, in turn, displaced by an aqueous solution containing 50 percent by weight of Acrysol Al, a 25 percent by weight solution of polyacrylic acid in water. A 10 percent by weight aqueous solution of the polyacrylic acid has a viscosity of about 16 centipoises. While the polyacrylic acid was being pumped into the simulated well, the 8 valves in the wall of the drum were opened. A squeeze pressure of 10 p. s. i. was imposed on the polyacrylic acid solution and was held for 30 minutes. The acid solution was then displaced from the well by water which was in turn displaced by drilling fluid. The pressure dropped only from 5 p. s. i. to 3 p. s. i. overnight with the valves in the drum wall open. This illustrates the low permeability of the consolidated filter cake and sand.

Finally, the mud was flushed from the system with water and the drum and its contents were split in half vertically and the sand and filter cake were examined. The filter cake was strong, tough and rubbery. The sand for about 2 to 3 inches behind the filter cake was also well consolidated and had considerable compressive and tensile strength. The remainder of the sand in the drum was unchanged.

A high pressure test was made using a 12-inch length of standard 6-inch steel pipe. Flanges were placed on both ends to permit sealing the ends. The chamber was loaded with sand by closing one end and setting the cylinder up on the closed end. It was then packed with sand to within about 2-inches of the open end. An 18 mesh screen wire was placed over the sand and held in place by a highly perforated sheet of metal. The cylinder was then turned on its side and the open end was closed with a flange. This flange had two openings, one near the bottom of the cylinder as it lay on its side, and the other near the top. Drilling fluid was pumped in the lower opening and flowed out the top after passing upwardly past baffles which forced the mud to flow close to the sand face behind the perforated plate and the screen. An opening in the sand-packed end of the chamber allowed flow of liquid from this end to permit penetration of the sand by the drilling fluid filtrate. The drilling fluid in this case contained a fresh water base and 67 pounds of natural clay, 8 pounds of bentonite, 5 pounds of Lomar D and 70 pounds of calcium chloride per barrel of drilling fluid.

After circulating the drilling fluid through the open end of the chamber until considerable filtrate had penetrated the sand, the mud was displaced with water which was in turn displaced by a 50% aqueous solution of Acrysol Al. This solution was held against the sand for a period of 1 hour. The acid solution was displaced by water and a permeability test was run to determine if the filter cake and sand had become impermeable. The pipe was then opened and the sand was removed as a plug. The filter cake and sand immediately behind it were then examined and the shear strength of each was measured by placing about a ⅛-inch thick slice over a ⅜-inch hole in a horizontal steel plate. A rod ¼-inch in diameter was then placed on end on the specimen over the center of the hole. The weight which had to be applied to the top of the rod to cause it to penetrate the specimen was then determined as a measure of the shear strength of the filter cake or sand layer. A numerical value for shear strength was obtained by the following formula:

$$S = \frac{p}{\pi d h}$$

In this formula S is the shear strength in pounds per square inch, d is the rod diameter in inches, h is the specimen thickness in inches, and p is the weight on the rod in pounds. The entire test was repeated with the cylinder in a hot water bath to determine the effects of temperature. Three tests were conducted. The results are reported in Table I.

TABLE I

*Large scale test results*

| Test Number | 1 | 2 | 3 |
| --- | --- | --- | --- |
| Pumping Time, hrs | 5 | 2 | 2 |
| Flow Temperature, °F | 95 | 80 | 113 |
| Formation Temperature, °F | 95 | 80 | 170 |
| Pressure, p. s. i | 150 | 250 | 250 |
| Permeability of formation after test | 0 | 0 | 0 |
| Penetration of set into formation, in | 2 | 10 | 4 |
| Cake Strength, Shear p. s. i | 159 | 145 | 150 |
| Sand Strength, Shear p. s. i | 10 | 19 | 17 |

The three most important points to be noted in the table are as follows:

(1) The filter cake developed a high shear strength and the sand behind it developed enough strength to avoid sand flow into a well.

(2) Higher pressures resulted in much deeper penetration of the set zone into the sand.

(3) Higher temperatures, even at higher differential pressures, produced a narrow zone of penetration because of the high rate of the cross-linkage reaction at elevated temperatures.

In one broad aspect of our invention the drilling fluid is simply a convenient means for impregnating the mass to be treated with an aqueous solution of a polyvalent metal cation. Any other drilling fluid having a filtrate containing a high concentration of such ions may, of course, also be used.

If a well has been drilled with a drilling fluid which does not contain a high concentration of polyvalent metal cations, our process may still be employed. An aqueous solution of the polyvalent cation can first be squeezed through the filter cake and into the formation. Polyacrylic acid can then be squeezed into the same zone to cause setting. Preferably, packers are employed and the well is treated in short sections. The solutions of polyvalent cations and polyacrylic acid should always be separated until injected into the formation. This prevents intermingling and possible solidification in the treating equipment. For example, after a zone of the well has been squeezed with an aqueous solution of a polyvalent cation, this solution should be displaced from well equipment with water before the polyacrylic acid solution is introduced into the equipment.

It will be apparent that many of the advantages of our invention as applied to a well can be retained by reversing the order of treating. That is, the filter cake and formation can be impregnated first with polyacrylic acid and then treated with a polyvalent cation. This order of treatment is not preferred, however, since polyvalent cations naturally present in the filter cake and formation may produce considerable cross-linkage of the polyacrylic acid. This cross-linkage may be sufficient to prevent effective penetration by the solution containing the high concentration of ions necessary to form a really effective cross-linkage and consequent consolidation. In addition, the polyvalent cation solution if introduced first tends to flush out any monovalent cations which might interfere with the cross-linking.

Many filter cakes are so impermeable that effective penetration by either of the polyvalent cation solutions or the polyacrylic acid solutions cannot be obtained. In such cases, the filter cake should be removed. The removal may be before or during the treatment. For example, scratchers may be employed to scrape the cake away from the formation. This is particularly desirable if consolidation of the loose sand is the principal object. In this case it may even be desirable to scratch off the filter cake deposited by the high calcium drilling fluid. The process for consolidating loose sand formations penetrated by a well is the same as for forming an impermeable plug except that only a small batch of polyacrylic acid is injected, and a water or oil flush is then used to establish permeable channels through the consolidated sand zone near the well. That is, just enough polyacrylic acid solution is injected to fill the pore spaces for 4 or 5 inches back from the well so the following flush can penetrate this thickness to establish permeability.

Our method may be used in wells for purposes other than preventing filtrate penetration of sand stringers in shale and consolidating loose sands. For example, it may be used to plug off water or gas zones. It may also be used in shallow wells drilled in earthen dams to impermeabilize the dams and prevent water seepage. Many other uses will occur to those skilled in the art. In most, if not all of these methods, care should be taken not to employ pressure sufficient to fracture the formations. This is particularly important in case the object is to form an impermeable plug. Variations in the method may also be used. For example, finely divided solids such as clay, limestone, fly ash, naphthalene, rosin, or the like, may be introduced with either or both of the injected solutions to cause more uniform penetration of formations of various permeabilities. Some zones or formations may be blanketed prior to treatment of the well by our method. This blanketing may be by depositing opposite the formation or injecting into them, materials such as aqueous gels of starch, locust bean gum, carboxymethylcellulose, or the like. Hydrocarbon gels containing aluminum stearate or other metallic soaps of fatty acids or the like may also be used. Again, many other variations will occur to those skilled in the art.

If the method is applied to soil consolidation, the soil may be slurried with an aqueous solution containing the polyvalent metal cation such as calcium. The polyacrylic acid can then be blended into the slurry as it is deposited in the desired location. This blending and depositing must be very rapid, however, since the reaction proceeds quickly to solidify the slurry. Generally, it is safer to spray the polyacrylic acid onto the slurry of soil and solution of polyvalent cation after the slurry is deposited in place. The polyacrylic acid may then be mixed into the slurry. For example, the slurry and polyacrylic acid solution may be raked to cause mixing. It is possible, of course, to slurry the soil with an aqueous solution of polyarcylic acid, the polyvalent cation being mixed in last. This order of mixing is not preferred, however, since any polyvalent cations naturally present in the soil may initiate cross-linking and give a partial set to the slurry before the principal body of the cation can be added. The result may be setting of the slurry in the slurrying equipment. Even if the slurry is deposited, the permeability of the mass may be too low to permit penetration by sufficient polyvalent cations to form a really effective cross-linkage. In addition, there is an increased opportunity for interference by monovalent cations if the polyacrylic acid is used first.

It will be apparent that the principles of our method can be employed in several additional ways in soil consolidation. For example, both the polyacrylic acid and the polyvalent cations may be simply sprayed onto the surface of the soil to be consolidated, particularly if deep penetration is not required. For example, it may be desired to treat the bottom of a pond to decrease leakage. If the soil is highly permeable, considerable penetration may even be obtained by spraying one of the reactants and then the other onto the soil. If better penetration is desired, the reactants may be stirred into the soil by raking, for example. All of one reactant and then all of the other may be added to the soil if desired. It is also possible, and may be desirable in the case of highly permeable soil, to add alternately a small amount of one and then a small amount of the other through several cycles to achieve the desired degree of impermeability and consolidation.

The term "soil" is used in its broadest sense herein to include fine silt, sand, clay, shale, and other normal constituents of earth, even including rocky earth. In general, this term indicates substantially the same thing herein as it does in the literature dealing with "soil consolidation" by use of calcium arcylate.

From the above description and examples it will be apparent that we have accomplished the objects of our invention. While specific materials and methods have been mentioned, various alternates and variations will occur to those skilled in the art. Hence, we do not wish to be limited to these specific examples and theories, but only by the limits of the following claims.

We claim:
1. A method for increasing the degree of consolidation and decreasing the permeability of a mass of solids comprising contacting said mass separately with two aqueous solutions, one solution containing between about 5 and about 50 percent by weight of a polyacrylic acid, said polyacrylic acid having a molecular weight such that a 10 percent by weight aqueous solution thereof has a viscosity in the range between about 5 and about 200 centipoises; and the other solution containing a water-soluble source of a polyvalent cation in a concentration of at least about $W/2MV$ pounds per 42-gallon barrel where W is the pound molecular weight of the source of the polyvalent cation, M is the number of polyvalent cations per molecule of said source, and V is the valence of said polyvalent cation.

2. The method of claim 1 in which said source of polyvalent cations is calcium chloride and said polyarcylic acid is a polymer of unsubstituted acrylic acid.

3. The method of claim 1 in which the mass to be consolidated is a soil.

4. A method for treating a formation penetrated by a well to increase the degree of consolidation and decrease the permeability of said formation comprising introducing into the well and injecting into said formation separately, two solutions, one solution containing between about 5 and about 50 percent by weight of polyacrylic acid, said polyacrylic acid having a molecular weight such that a 10 percent by weight aqueous solution thereof has a viscosity in the range of between about 5 and about 200 centipoises, and the other solution containing a water-soluble source of a polyvalent cation in a concentration of at least about $W/2MV$ pounds per 42-gallon barrel where W is the pound molecular weight of the source of the polyvalent cation, M is the number of polyvalent cations per molecule of said source, and V is the valence of said polyvalent cation.

5. The method of claim 4 in which said polyacrylic acid solution is flushed back into the formation with sufficient flushing fluid to establish permeability channels through the consolidated zone.

6. The method of increasing the degree of consolidation and decreasing the permeability of formations penetrated by a well comprising drilling said well using a drilling fluid containing at least about $W/4M$ pounds of a water-soluble calcium salt per barrel of drilling fluid, where W is the pound molecular weight of said salt and M is the number of calcium ions per molecule of said salt, and subsequently injecting into said formation an aqueous solution containing from about 5 to about 50 percent by weight of polyacrylic acid, said polyacrylic acid having a molecular weight such that a 10 percent by weight aqueous solution thereof has a viscosity in the range of between about 5 and about 200 centipoises.

7. The method of claim 6 in which said calcium salt is calcium chloride and said polyacrylic acid is a polymer of unsubstituted acrylic acid.

8. The method of claim 6 in which the filter cake is removed from the well wall to permit better penetration of the formation by said polyacrylic acid solution.

9. The method of claim 6 in which said drilling fluid comprises a water base and in each barrel of drilling fluid from about 5 to about 150 pounds of clay solids, from about 3 to about 10 pounds of a condensed naphthalene sulfonate, and at least about $W/4M$ pounds of a water-soluble calcium salt where W is the molecular weight of said calcium salt and M is the number of calcium ions in each molecule of salt, said sulfonate having the formula $C_{10}H_6SO_3A(CH_2C_{10}H_5SO_3A)_nC_{10}H_6SO_3A$ where A is an alkali metal and $n$ is a number between 1 and about 5.

10. The method of claim 9 in which said water-soluble salt is calcium chloride, in the formula for said sulfonate $n$ is 4 and A is sodium, and said polyacrylic acid is a polymer of unsubstituted acrylic acid.

References Cited in the file of this patent
UNITED STATES PATENTS

| | | |
|---|---|---|
| 2,248,457 | Hart | July 8, 1941 |
| 2,650,905 | Fordyce | Sept. 1, 1953 |
| 2,738,010 | Hall | Mar. 13, 1956 |